(12) United States Patent
Detweiler

(10) Patent No.: US 11,713,687 B1
(45) Date of Patent: Aug. 1, 2023

(54) FLAPPING HINGE FOR A FAN BLADE

(71) Applicant: General Electric Company, Schenectady, NY (US)

(72) Inventor: Gregory L. Detweiler, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/696,995

(22) Filed: Mar. 17, 2022

(51) Int. Cl.
| | | |
|---|---|---|
| *B64C 11/28* | (2006.01) | |
| *B64C 11/30* | (2006.01) | |
| *F01D 5/02* | (2006.01) | |
| *F01D 7/00* | (2006.01) | |

(52) U.S. Cl.
CPC ............... *F01D 7/00* (2013.01); *B64C 11/28* (2013.01); *B64C 11/30* (2013.01); *F01D 5/021* (2013.01); *F05D 2220/36* (2013.01); *F05D 2260/70* (2013.01)

(58) Field of Classification Search
CPC ....... B64C 11/003; B64C 11/28; B64C 11/30; B64C 11/32; B64C 11/34; B64C 11/343; B64C 11/363; F01D 7/00; F01D 7/02; F05D 2220/36; F05D 2260/70; F02K 3/04; F02K 3/06; F02K 3/062; F02K 3/065; F02K 3/072
See application file for complete search history.

(56) References Cited

U.S. PATENT DOCUMENTS

| | | | | |
|---|---|---|---|---|
| 4,394,109 | A | * | 7/1983 | Ritchie ...................... F01D 7/00 415/129 |
| 4,936,526 | A | * | 6/1990 | Gries ....................... B64C 11/48 416/129 |
| 4,979,876 | A | * | 12/1990 | Chapman ................. B64C 11/28 244/3.29 |
| 6,065,933 | A | | 5/2000 | Secord |
| 8,701,380 | B2 | * | 4/2014 | Vuillemin ............... B64C 11/48 60/39.15 |
| 8,998,125 | B2 | | 4/2015 | Hollimon et al. |
| 9,884,675 | B2 | * | 2/2018 | Curlier ..................... F02K 3/072 |
| 9,937,999 | B2 | | 4/2018 | Wainfan et al. |
| 10,301,008 | B1 | * | 5/2019 | Reichert ................. B64C 11/343 |
| 10,933,992 | B2 | | 3/2021 | Baskin et al. |
| 11,021,230 | B2 | * | 6/2021 | Binder .................. B64C 11/308 |

FOREIGN PATENT DOCUMENTS

| | | |
|---|---|---|
| DE | 2421627 A1 | 11/1975 |
| GB | 264992 A | 2/1927 |
| WO | WO2019194700 A1 | 10/2019 |

* cited by examiner

*Primary Examiner* — Christopher R Legendre
(74) *Attorney, Agent, or Firm* — Dority & Manning, P.A.

(57) ABSTRACT

An engine defining a longitudinal axis includes: a turbomachine; a fan drivingly coupled with the turbomachine, the fan being a forward thrust fan and having: a hub; a plurality of fan blades, the plurality of fan blades comprising a first fan blade; and a flapping hinge integrated into the first fan blade or coupled to the fan blade, at least a portion of the first fan blade moveable about the flapping hinge to define a variable angle with the longitudinal axis.

18 Claims, 5 Drawing Sheets

US 11,713,687 B1

FLAPPING HINGE FOR A FAN BLADE

FIELD

The present disclosure relates to a flapping hinge for a fan blade of a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly.

Fan assemblies may be ducted or unducted. Unducted fan assemblies are open to ambient airflow, which may include off-axis airflow due to crosswinds or a high angle of attack of the gas turbine engine at low speeds. This may cause a dissymmetry of lift on the fan assembly.

Improvements to reduce the dissymmetry of lift on the fan assembly would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
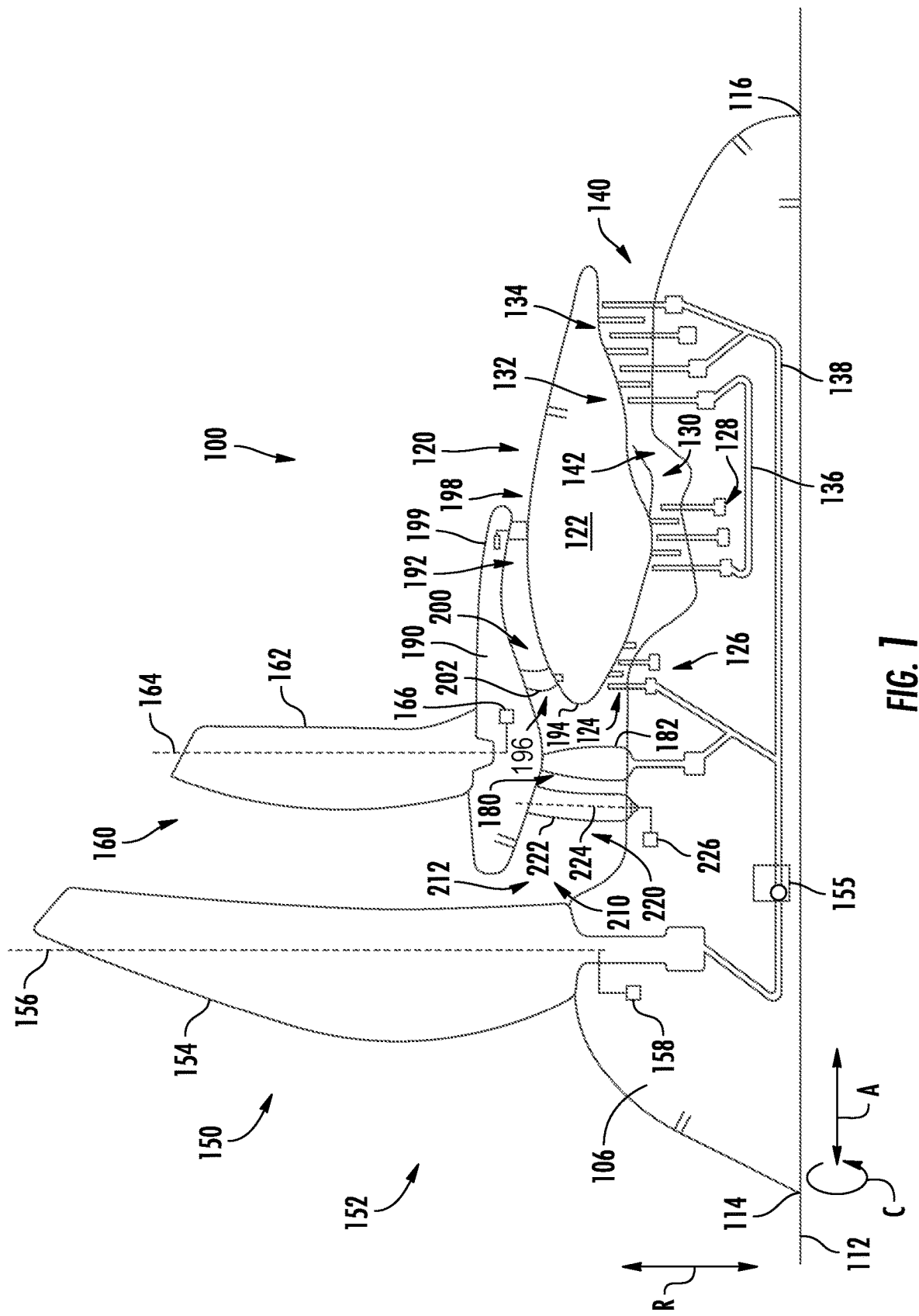
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., —er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The term "hub" may generally refer to the inner portion of the fan along the radial direction, including a fan rotor assembly, a rotor disk, one or more trunnions, or the like.

As used herein, the terms "integral" or "unitary" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

The present disclosure is generally related to a system for accommodating asymmetric disc loading of an unducted fan or propeller. In particular, the present disclosure is generally related to a system that incorporates a mechanical flapping hinge into the blades of a fan in a gas turbine engine. Unducted fans of gas turbine engines may be open to ambient airflow. This includes off-axis airflow due to crosswinds or a high angle of attack of the gas turbine engine at low airspeeds. This results in dissymmetry of lift on a fan assembly of the gas turbine engine and may induce high once per revolution loads ("1P loads") in the turbine engine and any mounting structures attached to it.

In general, a mechanical flapping hinge is provided that allows for movement of the fan blades in the axial direction of travel of the turbine engine. This may change the effective angle of attack of airflow on the fan blades and result in a reduction of the dissymmetry of lift. Additionally, the mechanical flapping hinge may allow some of the dissymmetric lift to be absorbed by the fan blades themselves, as they move axially.

In another embodiment, the system can also allow the blades to lay back towards or against the nacelle of the gas turbine engine during an in-flight shutdown, or otherwise when not rotating, in turn reducing a frontal area and drag during the in-flight shutdown.

Referring now to the drawings, wherein identical numerals indicate the same elements throughout the figures, FIG. 1 is a schematic illustration of an engine 100 (e.g., a turboprop or turbofan) of an aircraft. As shown in FIG. 1, the engine 100 has a longitudinal axis 112 or axial centerline that extends therethrough for reference purposes. The engine 100 further defines an upstream end 114 (or forward end) and a downstream end 116 (or aft end) for reference.

In general, an axial direction A extends parallel to the longitudinal axis 112, a radial direction R extends outward from and inward to the longitudinal axis 112 in a direction orthogonal to the axial direction A, and a circumferential direction C extends three hundred sixty degrees (360°) around the longitudinal axis 112.

The engine 100 includes a turbomachine 120. Generally, the turbomachine 120 includes, in serial flow order, a compressor section, a combustion section, a turbine section, and an exhaust section. As shown in FIG. 1, the turbomachine 120 includes a core cowl 122 or core duct that defines an annular core inlet 124.

The core cowl 122 further encloses at least in part a low-pressure system and a high-pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems and are not meant to imply any absolute speed and/or pressure values.

The high energy combustion products flow from the combustor 130 downstream to a high-pressure turbine 132. The high-pressure turbine 132 drives the high-pressure compressor 128 through a high-pressure shaft 136. In this regard, the high-pressure turbine 132 is drivingly coupled with the high-pressure compressor 128.

The high energy combustion products then flow to a low-pressure turbine 134. The low-pressure turbine 134 drives the low-pressure compressor 126 and components of a fan section 150 through a low-pressure shaft 138. In this regard, the low-pressure turbine 134 is drivingly coupled with the low-pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

The turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 or working gas flowpath through the turbomachine 120 may be referred to as a second stream.

The engine includes a rotor assembly including the fan section 150. The fan section 150 includes a fan 152, which is the primary fan in this example embodiment. For the depicted embodiment of FIG. 1, the fan 152 is an open rotor or unducted fan 152. As depicted, the fan 152 includes an array of fan blades 154 (only one shown in FIG. 1). The fan blades 154 are rotatable, e.g., about the longitudinal axis 112. As noted above, the fan 152 is drivingly coupled with the low-pressure turbine 134 via the LP shaft 138.

The fan 152 can be directly coupled with the LP shaft 138, in a direct-drive configuration or via a speed reduction gearbox 155, e.g., in an indirect-drive or geared-drive configuration.

Each fan blade 154 has a root and a tip and a span defined therebetween. Each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blade axis 156. The one or more actuators 158 may be referred to collectively as a pitch change mechanism. In certain embodiments, the pitch change mechanism can include a hydraulic actuator (or an electric actuator or a mechanical actuator) which controls the pitch of the fan blades 154.

The fan section 150 further includes an outlet guide vane array 160 that includes outlet guide vanes (OGV) 162 (only one shown in FIG. 1) or fan guide vanes disposed around the longitudinal axis 112. Each outlet guide vane 162 has a root and a tip and a span defined therebetween.

Each outlet guide vane 162 defines a central blade axis 164. For this embodiment, each outlet guide vane 162 of the outlet guide vane array 160 is rotatable about their respective central blade axis 164, e.g., in unison with one another. In other embodiments, each outlet guide vane 162 of the outlet guide vane array 160 may be rotatable about their central blade axis 164 independently to differing extents. One or more actuators 166 are provided to facilitate such rotation and therefore may be used to change a pitch of the outlet guide vane 162 about their respective central blade axis 164.

The flowpath through the outlet guide vanes 162 may be referred to as a first stream.

In addition to the fan 152, which is unducted, a ducted fan or midfan 180 is included aft of the fan 152, such that the engine 100 includes both a ducted fan and an unducted fan which both serve to generate thrust through the movement of air through at least a portion of the engine 100. The ducted midfan 180 is shown at about the same axial location as the outlet guide vane 162, and radially inward of the outlet guide vane 162.

As depicted, the ducted midfan 180 includes an array of midfan blades 182 (only one shown in FIG. 1). The midfan blades 182 are rotatable, e.g., about the longitudinal axis 112. The ducted midfan 180 is, for the embodiment depicted, driven by the low-pressure turbine 134 (e.g., coupled to the LP shaft 138).

A fan cowl 190 annularly encases at least a portion of the core cowl 122 and is generally positioned outward of at least a portion of the core cowl 122 along the radial direction R. Particularly, a downstream section of the fan cowl 190 extends over a forward portion of the core cowl 122 to define a fan flowpath or fan duct 192. The fan flowpath or fan duct 192 may be referred to as a third stream of the engine 100. The third stream extends from or along a length of the compressor section to provide a rotor assembly flowpath over the turbomachine 120.

Incoming air may enter the fan duct 192 through a fan duct inlet 196 and may exit through a fan duct nozzle 198 to produce propulsive thrust. The fan duct 192 is an annular duct positioned generally outward of the core duct 142 along the radial direction R. The area of the fan duct nozzle 198 is variable. For example, the fan duct nozzle 198 has a variable area that is controlled by an actuator 199 to change the area of the fan duct nozzle 198. The area of the fan duct nozzle 198 at least partially determines the thrust through the fan duct 192.

The fan duct 192 includes a fan duct guide vane array 200 that includes fan duct guide vanes 202 (only one shown in FIG. 1) disposed around the longitudinal axis 112. Each fan duct guide vane 202 has a root and a tip and a span defined therebetween. The fan duct guide vane array 200 is a guide vane array for the fan duct 192, which again may also be referred to as a third stream. In alternative embodiments, such as a two-stream engine architecture, the fan duct 192 is omitted.

The fan cowl 190 and the core cowl 122 may be connected and supported by a plurality of substantially radially-extending, circumferentially-spaced stationary struts (not shown in FIG. 1). The stationary struts may each be aerodynamically contoured to direct air flowing thereby. Other struts in addition to the stationary struts may be used to connect and support the fan cowl 190 and/or core cowl 122.

The fan duct 192 and the core duct 142 may at least partially co-extend (generally axially) on opposite sides (e.g., opposite radial sides) of the core cowl 122. For example, the fan duct 192 and the core duct 142 may each extend directly from a leading edge 194 of the core cowl 122 and may partially co-extend generally axially on opposite radial sides of the core cowl 122.

The engine 100 also defines or includes an inlet duct 210. The inlet duct 210 extends between an engine inlet 212 and the core inlet 124/fan duct inlet 196. The engine inlet 212 is defined generally at the forward end of the fan cowl 190. The inlet duct 210 is an annular duct that is positioned inward of the fan cowl 190 along the radial direction R.

Air flowing downstream along the inlet duct 210 is split, not necessarily evenly, into the core duct 142 and the fan duct 192 by a splitter or the leading edge 194 of the core cowl 122. The inlet duct 210 is wider than the core duct 142 along the radial direction R. The inlet duct 210 is also wider than the fan duct 192 along the radial direction R.

In exemplary embodiments, air passing through the fan duct 192 may be relatively cooler (e.g., lower temperature) than one or more fluids utilized in the turbomachine 120. In this way, one or more heat exchangers may be disposed within the fan duct 192 and utilized to cool one or more fluids from the core engine with the air passing through the fan duct 192, as a resource for removing heat from a fluid, e.g., compressor bleed air, oil, or fuel. By positioning the fan duct inlet 196 to the fan duct 192 downstream of the ducted midfan 180 (such that an airflow through the fan duct 192 is a pressurized airflow from the ducted midfan 180), an airflow through the fan duct 192 may have a sufficient pressure during operation of the engine 100 such that a pressure drop experienced by the airflow when provided over such one or more heat exchangers in the fan duct 192 may not prevent the airflow from providing a desired amount of thrust for the engine 100 when such airflow exits through the fan duct nozzle 198.

Although not depicted, in certain exemplary embodiments, the engine 100 may further include one or more heat exchangers in other annular ducts or flowpath of the engine 100, such as in the inlet duct 210, in the turbomachinery flowpath or core duct 142, within the turbine section and/or turbomachine exhaust nozzle 140, etc.

The inlet duct 210 includes an inlet guide vane array 220 that includes inlet guide vanes 222 (only one shown in FIG. 1) disposed around the longitudinal axis 112. Each inlet guide vane 222 has a root and a tip and a span defined therebetween. The inlet guide vane array 220 is a guide vane array for the inlet duct 210.

Each inlet guide vane 222 defines a central blade axis 224. For this embodiment, each inlet guide vane 222 of the inlet guide vane array 220 is rotatable about their respective central blade axis 224, e.g., in unison with one another. One or more actuators 226 are provided to facilitate such rotation and therefore may be used to change a pitch of the inlet guide vane 222 about their respective central blade axis 224.

It should be appreciated that the exemplary engine 100 depicted in FIG. 1 is by way of example only, and that in other exemplary embodiments, the engine 100 may have any other suitable configuration. For example, aspects of the present disclosure may be utilized with any other suitable aeronautical gas turbine engine, such as a turboshaft engine, turboprop engine, turbojet engine, etc. Further, aspects of the present disclosure may further be utilized with any aeroderivative gas turbine engine, such as a nautical gas turbine engine.

Other gas turbine engines to which the present disclosure may be applied may have alternative configurations. By way of example such engines may have an alternative number of interconnecting shafts (e.g., two) and/or an alternative number of compressors and/or turbines. Further the engine may not include a gearbox provided in the drive train from a turbine to a compressor and/or fan, may be configured as a two-stream gas turbine engine (e.g., excluding the fan duct 192), may not include a midfan 180, etc.

In addition, it will be appreciated that in other exemplary embodiments of the present disclosure, still other engine configurations may be utilized. For example, in other exemplary embodiments of the present disclosure, the ducted midfan 180 may be configured as part of a "fan on blade" configuration, whereby the midfan blades 182 are mounted to, or extend from, an inner compressor blade (e.g., from an inner low-pressure compressor or booster rotor blade).

Figure 2:
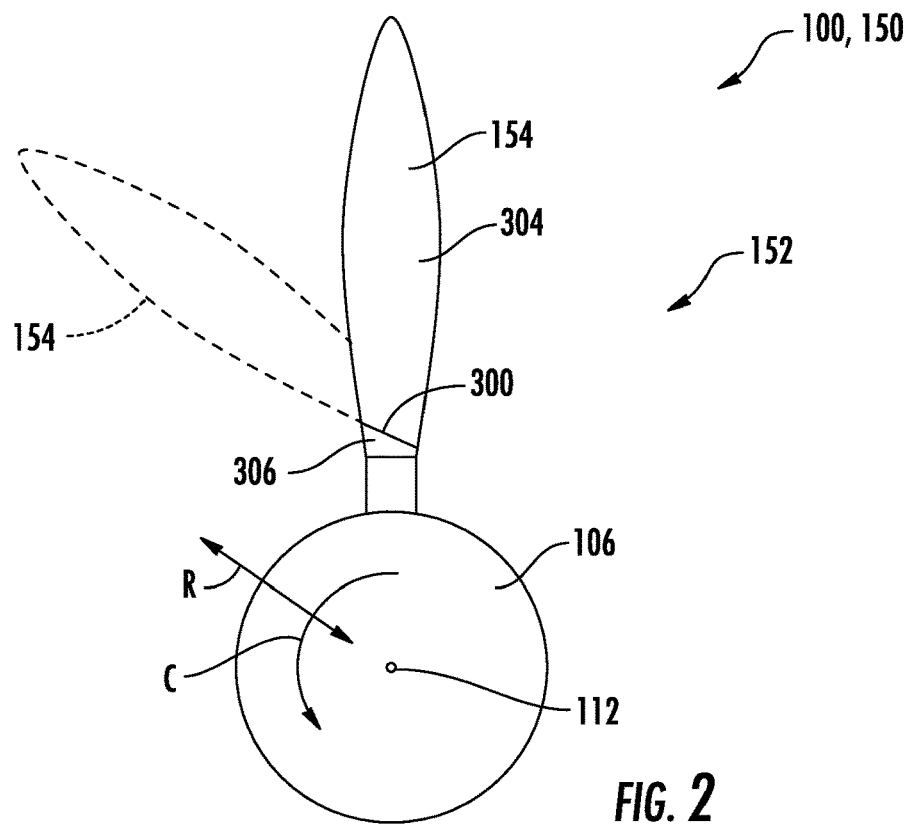
FIG. 2 is a schematic view of the turbine engine of FIG. 1 and a flapping hinge, in accordance with an exemplary aspect of the present disclosure.
Figure 3:
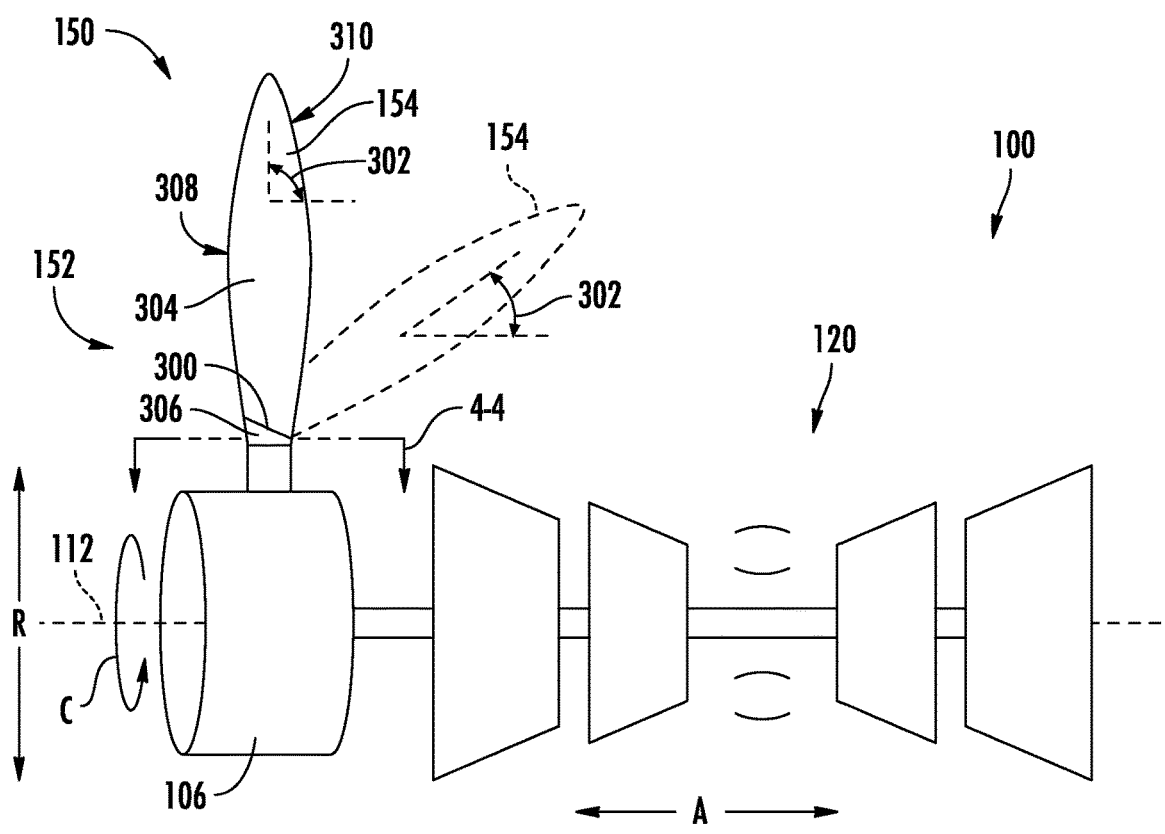
FIG. 3 is another schematic view of the turbine engine of FIG. 1 and flapping hinge of FIG. 2.

Referring now to FIGS. 2 and 3, schematic views of the exemplary gas turbine engine 100 of FIG. 1 are provided. More specifically FIG. 2 is a schematic view of a fan blade 154 of the fan 152 of the exemplary gas turbine engine 100 of FIG. 1 including a flapping hinge 300 in accordance with an exemplary aspect of the present disclosure, as viewed along the radial direction R of the gas turbine engine 100. FIG. 3 is a schematic view of the fan blade 154 and gas turbine engine 100 of FIG. 1 as viewed along the axial direction A of the gas turbine engine 100.

In such a manner, it will be appreciated that the fan 152 (shown in FIG. 1) can be a forward thrust fan and includes a plurality of fan blades 154 and a hub 106 rotatable with the plurality of fan blades 154. For clarity, only one fan blade 154 of the plurality of fan blades 154 is depicted in FIGS. 2 and 3 and described in greater detail below, and similarly, a single flapping hinge 300 is depicted in FIGS. 2 and 3.

The gas turbine engine 100 defines the longitudinal axis 112 and includes the turbomachine 120 and the fan section 150 drivingly coupled with the turbomachine 120. The fan 152 is a forward thrust fan and includes the hub 106, the fan blade 154, and the flapping hinge 300. The flapping hinge 300 is integrated into the fan blade 154 or coupled to the fan blade 154. As noted above, a single flapping hinge 300 and fan blade 154 are depicted in FIGS. 2 and 3. However, it will be appreciated that each of the plurality of fan blades 154 (see FIG. 1) may include a flapping hinge 300, with the flapping hinges 300 integrated into a respective one of the fan blades 154 or coupled to a respective one of the fan blades 154.

As will be discussed in more detail below, at least a portion of the fan blade 154 is moveable about the flapping hinge 300 to define a variable angle with the longitudinal axis 112. In such a manner, the flapping hinge 300 may allow for the fan blade 154 to accommodate for asymmetric disk loading of the fan section 150 and may also help to counter a dissymmetry of lift encountered during forward fight. This mechanical structure incorporated into the fan blade 154 allows the fan blade 154 to flap in the axial direction A (e.g., along a direction of travel; see, particularly, FIG. 3), and as will be discussed in more detail below, in the circumferential direction C (e.g., opposite a direction of rotation; see, particularly, FIG. 2). Such a flapping hinge 300 may reduce 1P loads in the fan blade 154.

As briefly noted above, the flapping hinge 300 is integrated into or coupled to the fan blade 154, which allows the fan blade 154 to flap in the axial direction A and circumferential direction C between a fully extended position and a fully flapped position (depicted in phantom in FIGS. 2 and 3). The axial portion of the movement of the fan blade 154 is shown in FIG. 3 and the circumferential portion of the movement of the fan blade 154 is shown in FIG. 2. In such a manner, it will be appreciated that at least a portion of the fan blade 154 is moveable about the flapping hinge 300 to define a variable flapping hinge angle 302 with the longitudinal axis 112. The flapping hinge angle 302 may be variable from between about 90 degrees (fully extended) to about 45 degrees (fully flapped) or any other suitable angle therebetween. Notably, both centrifugal force and drag forces tend to pull the fan blade 154 towards its fully extended (normal operating) position.

Moreover, it will be appreciated that the embodiment of FIGS. 2 and 3, the flapping hinge 300 is integrated into the fan blade 154, such that the fan blade 154 defines an outer portion 304 outward of the flapping hinge 300 along the radial direction R and an inner portion 306 inward of the flapping hinge 300 along the radial direction R. The fan blade 154 further defines a leading edge 308 and a trailing edge 310. The flapping hinge 300 further defines a flapping hinge axis 312 (see FIGS. 4 and 5), with the outer portion 304 rotatable about the flapping hinge axis 312 relative to the inner portion 306.

For the embodiment depicted, the outer portion 304 makes up at least 80% of a span of the fan blade 154, such as at least about 85%, such as at least about 90%. In other embodiments, the flapping hinge 300 may be positioned further inward along the radial direction R such that the fan blades 154 is coupled to the flapping hinge.

Figure 4:
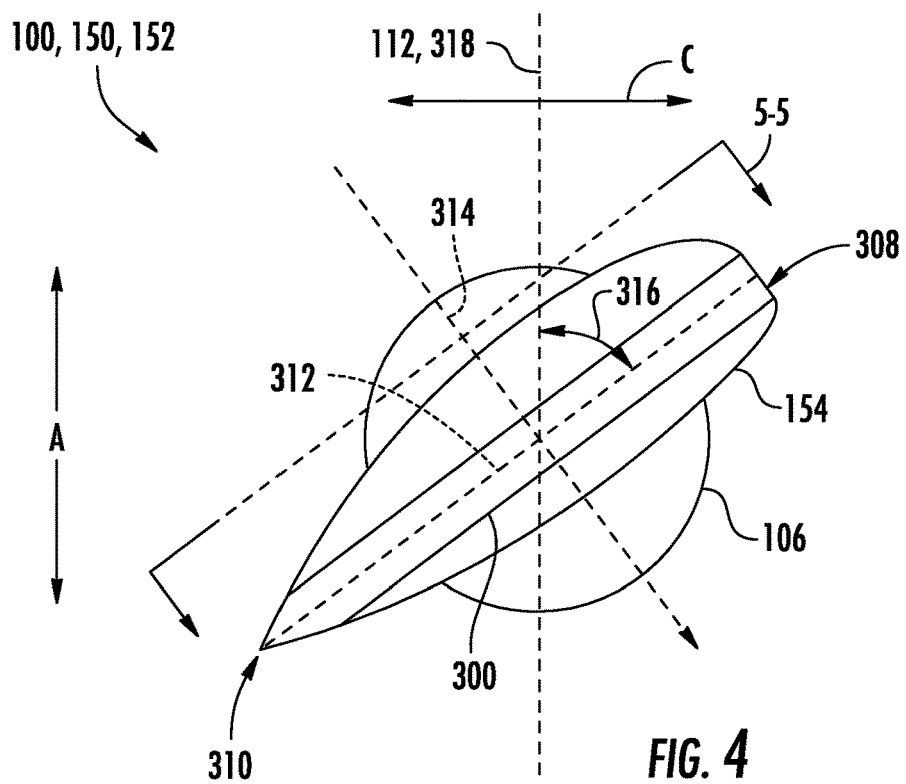
FIG. 4 is a close-up, schematic, cross-sectional view of the fan blade with the flapping hinge axis of FIG. 3.

As will be appreciated from FIGS. 2 and 3, the flapping hinge axis 312 extends from the leading edge 308 to the trailing edge 310. More specifically, FIG. 4 provides a close-up, schematic, cross-sectional view of the fan blade 154 with the flapping hinge axis 312. FIG. 4 is viewed along Line 4-4 in FIG. 3, i.e., looking inward along the radial direction R. As shown, the flapping hinge axis 312 extends from the leading edge 308 to the trailing edge 310, and the outer portion 304 defines a direction of rotation 314 about the flapping hinge axis 312. As noted, the flapping hinge axis 312 defines a first angle 316 with the longitudinal axis 112 (and more specifically with a plane 318 defined by the longitudinal axis 112 and the radial direction R), which is between 0 degrees and 180 degrees, such as between 10 degrees and 85 degrees, such as between 15 degrees and 75 degrees. In such a manner, the direction of rotation 314 is not parallel with the longitudinal axis 112 of the gas turbine engine 100, and instead defines an angle with the longitudinal axis 112 which may be approximately equal to the first angle 316.

Figure 5:
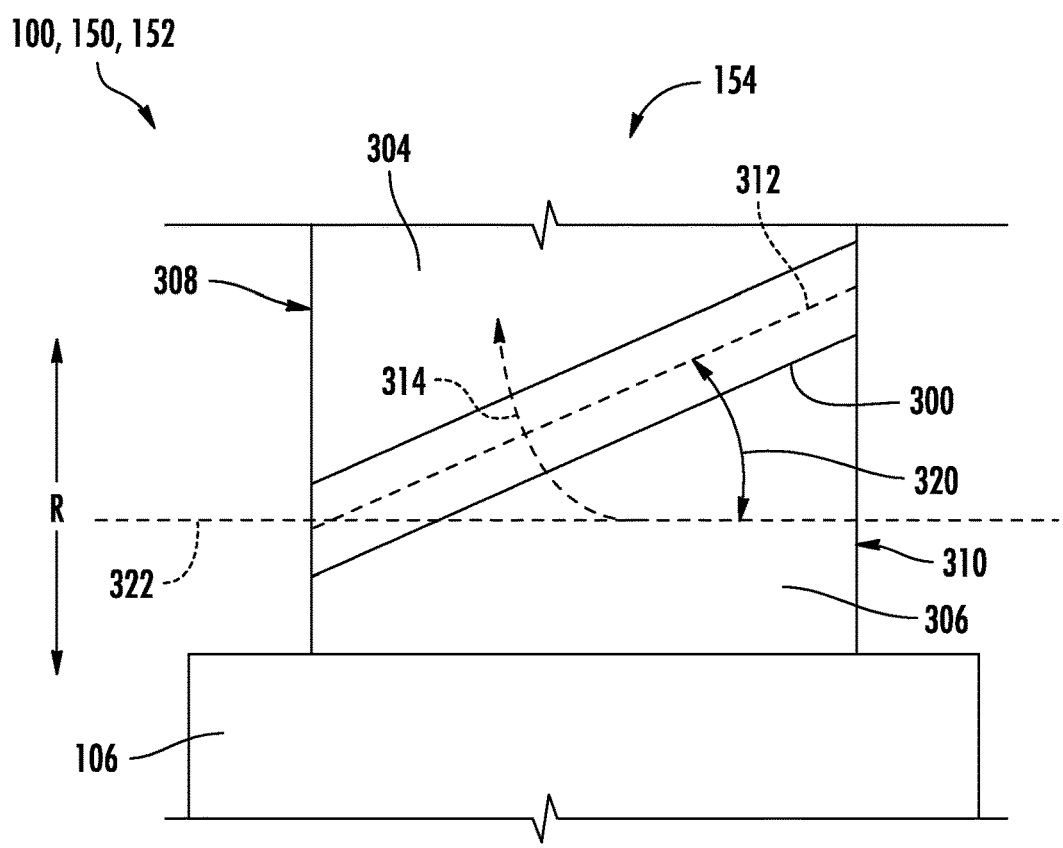
FIG. 5, a close-up, schematic view of the fan blade and flapping hinge of FIG. 4, as viewed along Line 5-5 in FIG. 4.

Further, referring now also to FIG. 5, a close-up, schematic view is provided of the fan blade 154 of FIG. 4, as viewed along Line 5-5 in FIG. 4. The view of FIG. 5 may be referred to as a plan view of a side of the fan blade 154 (e.g., a suction side of the fan blade 154). As noted, the flapping hinge axis 312 extends from the leading edge 308 to the trailing edge 310 of the fan blade 154. However, as will also be appreciated, the flapping hinge axis 312 further defines a second angle 320 with the longitudinal axis 112 (and more specifically with a plane 322 defined by a tangent to the circumferential direction C wherein the flapping hinge axis 312 meets the leading edge 308 of the fan blade 154 and the axial direction A/longitudinal axis 112). The second angle 320 may be greater than 0 degrees and less than 90 degrees, such as between about 5 degrees and 45 degrees. In such a manner, it will be appreciated that as the fan blade 154 pivots aft about the flapping hinge axis 312 in the direction of rotation 314, an angle of attack of the fan blade 154 changes, effectively decreasing in pitch as the fan blade 154 moves forward in the direction of rotation 314, and increasing in pitch as the fan blade 154 moves aft in the direction of rotation 314.

Figure 6:
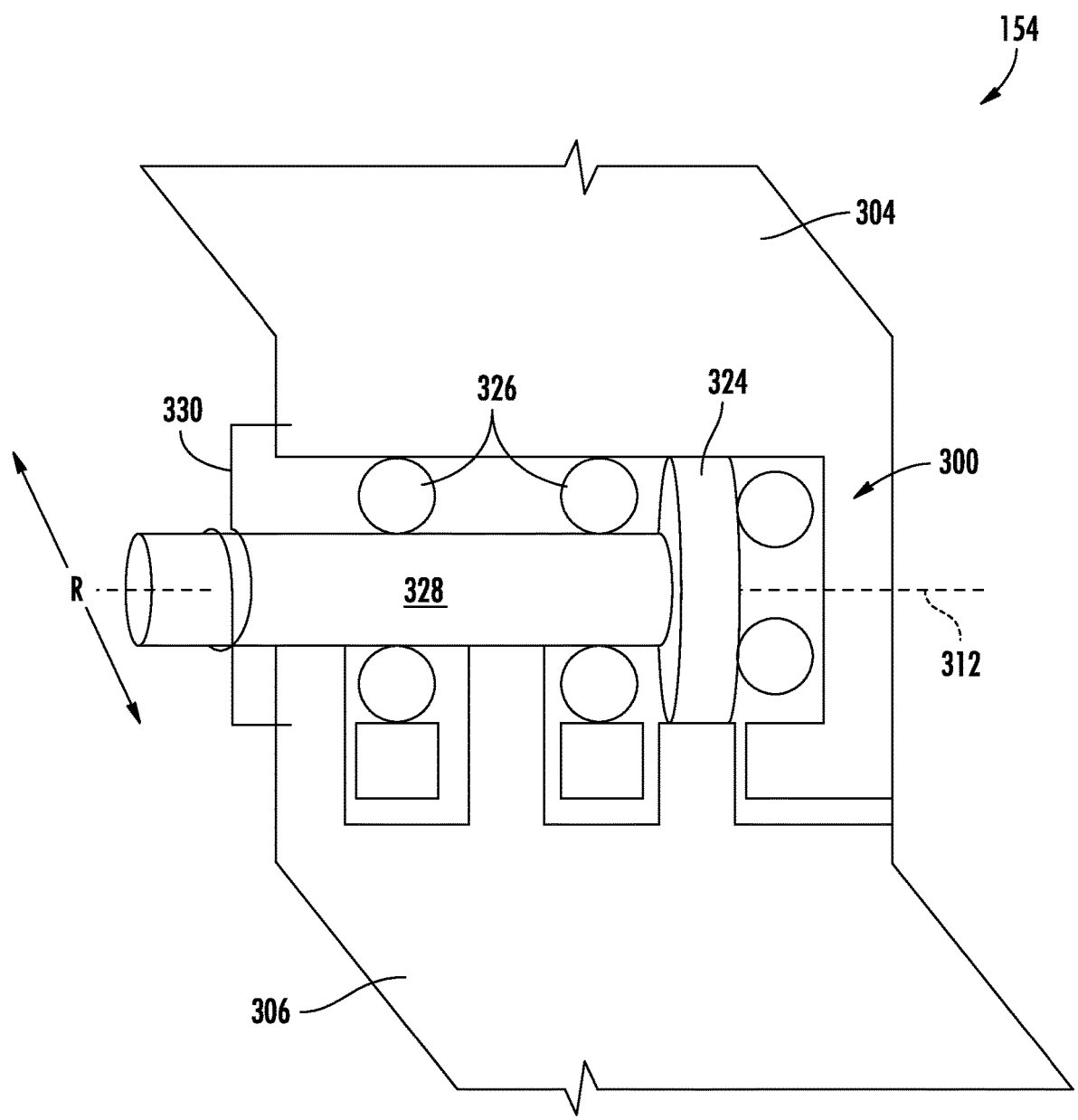
FIG. 6 is a schematic view of a flapping hinge in accordance with an exemplary aspect of the present disclosure.

Referring now to FIG. 6, a schematic view of a flapping hinge 300 integrated into a fan blade 154 is provided, in accordance with an exemplary aspect of the present disclosure. The flapping hinge 300 may be incorporated into one or more of the gas turbine engines 100, fans 152, and/or fan blades 154 described above with reference to FIGS. 1 through 5.

In the embodiment depicted, the fan blade 154 includes an outer portion 304 along a radial direction R and an inner portion 306 along the radial direction R, with the flapping hinge 300 integrated into the fan blade 154 between the outer portion 304 and the inner portion 306. The flapping hinge 300 includes roller bearings 324, thrust bearings 326, and a hinge shaft 328. The flapping hinge 300, and more particularly the hinge shaft 328, defines a flapping hinge axis 312. In particular, the roller bearings 324 and thrust bearings 326 facilitate a rotation of the outer portion 304 of the fan blade 154 relative to the inner portion 306 of the fan blade 154 about the flapping hinge axis 312. More specifically, the bearings 324, 326 facilitate rotation of the inner and outer portions 306, 304 of the fan blade 154 about the hinge shaft 328.

The flapping hinge 300 may also include a biasing member 330. The biasing member 330 may be an elastomeric or mechanical spring positioned to bias the fan blades 154 towards a fully extended position while, e.g., the fan 152 is stopped or during engine starts. However, the biasing member 330 may still allow for the fan blades 154 to move toward the flapped position (e.g., cone backwards) while shut down in flight. The relatively simple flapping hinge 300 (which includes a single axis of rotation) may ensure that the fan blades 154 cannot contact each other and will follow a specific arc in their movement.

In other embodiments, the flapping hinge 300 may be configured as any other suitable hinge, such as a piano hinge. With respect to the piano hinge, the piano hinge may be a continuous hinge that is substantially straight and sized to extend substantially a full length of the pieces being connected (e.g., the outer portion 304 and inner portion 306).

The relatively simple design of the flapping hinge 300 may have many benefits. For example, because there is a flapping hinge 300 on each of the fan blades 154, they may be easy to access and may be independently serviced. Additionally, the flapping hinges 300 have relatively small movement and may not require cooling or oil flow. Additionally, the flapping hinge 300 may not require any sensors or fast-moving actuators on the rotating fan blades 154.

Employing one or more of the exemplary flapping hinges 300 of the present disclosure with fan blades 154 of the fan 152 of the present disclosure may allow for a higher rotational speed of the fan 152, as 1P loads on the fan 152 can be reduced. For example, the fan blades 154 can be configured to rotate at a rotational speed between about 800 revolutions per minute ("rpm") and about 4,000 rpm.

Referring back briefly to FIG. 1, in certain embodiments, the gas turbine engine 100 may also include a pitch actuating system for changing a pitch of the fan blades 154 of the fan 152. The pitch actuating system rotates the fan blade 154 to change the pitch of the fan blade 154 independently of a flapping hinge 300. However, based on a configuration of the flapping hinge 300 and flapping hinge axis 312, rotation of the outer portion 304 of the fan blade 154 about the flapping hinge axis 312 may allow for an effective pitch angle of the fan blade 154 to be changed as well. For example, in at least certain exemplary aspects, for every 1 degree of rotation about the flapping hinge axis 312, there may be 1 degree of pitch change on the fan blade 154 itself. In such a manner, by the time the fan blade 154 is in a fully extended position it may be fully feathered against an incoming air flow.

Figure 7:
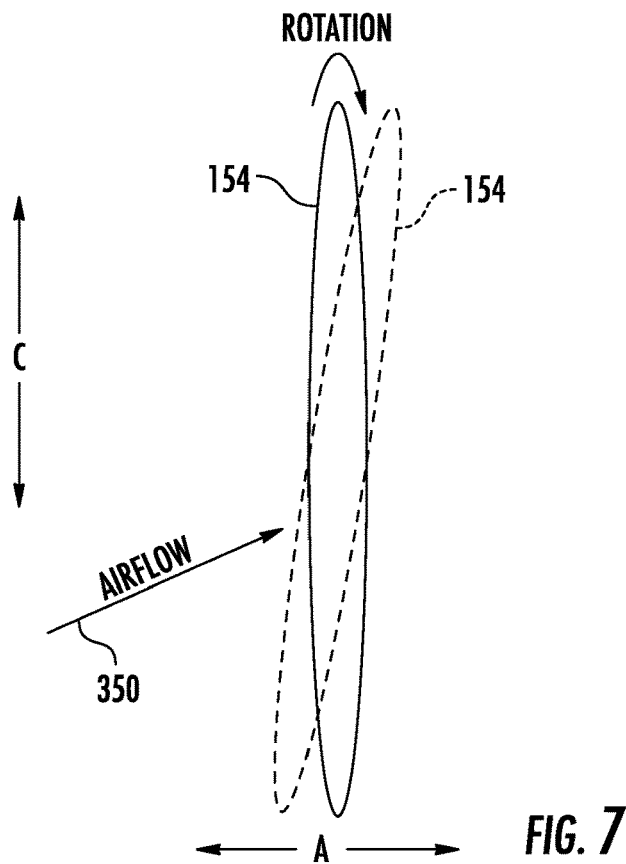
FIG. 7 is a schematic view of a fan blade in accordance with an exemplary aspect of the present disclosure.
Figure 8:
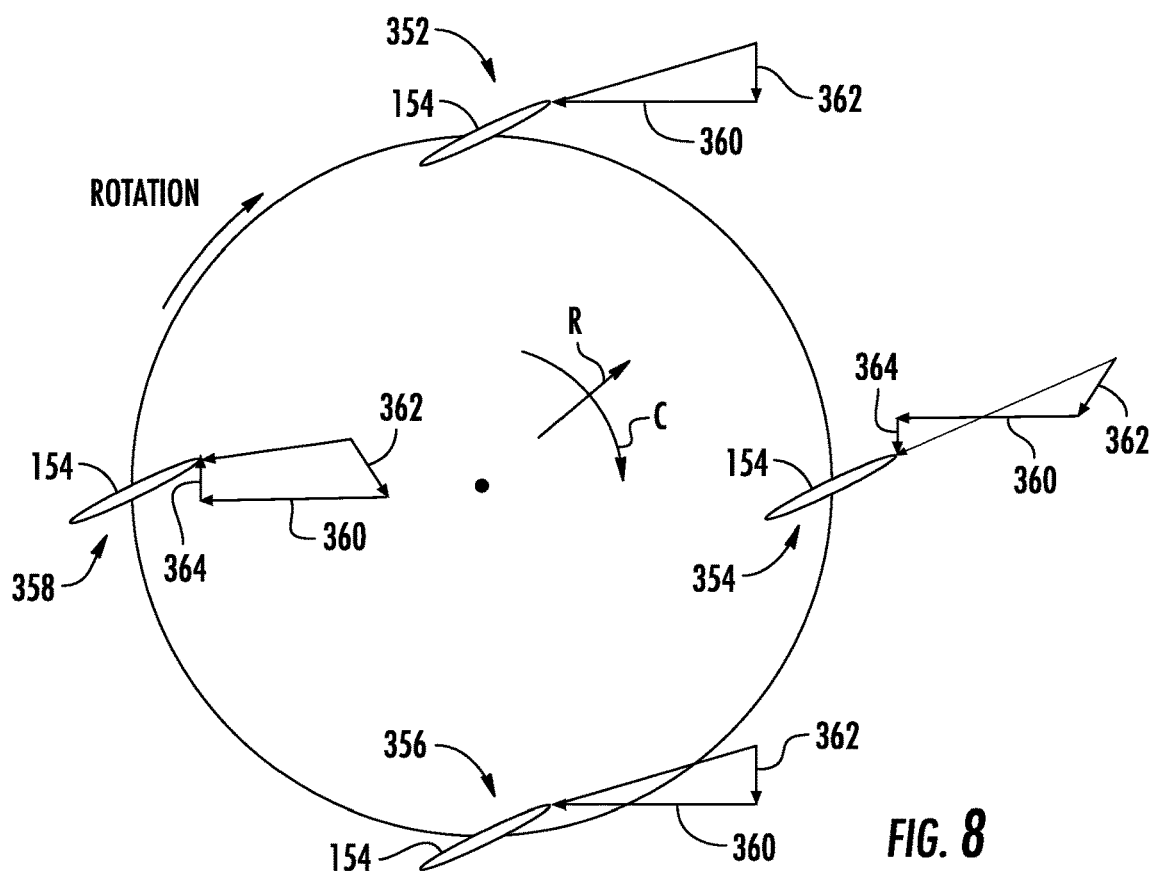
FIG. 8 is a graphical diagram of the exemplary fan blade and flapping hinge of FIG. 7 in operation, in accordance with an exemplary aspect of the present disclosure.

Referring now to FIGS. 7 and 8, operation of the fan blade 154 including the flapping hinge 300 will be described in more detail. FIG. 7 provides a schematic view of the fan blade 154 moveable about the flapping hinge 300 (not shown) between a deployed position and a feathered position (in phantom). FIG. 8 shows graphically an effect of the feathering of the fan blade 154 through a circumferential rotation of the fan blade 154 during an operation experiencing a non-uniform inlet airflow 350.

Referring first to FIG. 7, it will be appreciated that as the fan blade 154 is feathered, an effective pitch angle of the fan blade 154 is increased, such that a relative angle of attack of the inlet airflow 350 is changed, and an amount of lift generated by the fan blade 154 (and therefore thrust) is also changed.

Referring now to FIG. 8, the fan blade 154 is depicted at four different locations in a plane of rotation (view shown); a first location 352, a second location 354 (¼ rotation), a third location 356 (½ rotation), and a fourth location 358 (¾ rotation). As noted, the flapping hinge 300 is angled relative to this plane of rotation to allow for the operation noted above with respect to FIG. 7.

A vector diagram is provided at each of these locations showing a direction of rotation of the fan blade 154 (vector line 360), a direction of the inlet airflow 350 on the fan blade 154 (vector line 362; see FIG. 7 for element 350), and a movement of the fan blade 154 via the flapping hinge 300 (vector line 364). The graphical depiction in FIG. 8 is of a cross-flow operating condition (e.g., low forward speed with high cross winds). With such a configuration, at the first and third locations 352, 356, the incoming airflow experienced by the fan blade 154 is relatively axial.

At the second location 354, the fan blade 154 is descending, such that it is effectively experiencing a higher airspeed. The fan blade 154 rotates aft about the flapping hinge axis 312, effectively reducing the angle of attack of the fan blade 154 to even out the forces experienced by the fan 152 circumferentially. Similarly, at the fourth location 358, the fan blade 154 is ascending. As the fan blade 154 ascends in rotation, it encounters lower airspeed. However, a reduction of lift is countered by the flapping motion opposite the flapping motion noted above at the second location 354, effectively increasing the angle of attack of the fan blade 154 to even out the forces experienced by the fan 152 circumferentially.

Notably at each of these locations, a physical fan blade root pitch is constant, but an effective angle of attack changes due to the flapping motions.

Moreover, it will be appreciated that when the fan blade 154 is rotating, thrust forces pulling the blade aft are countered by centrifugal forces pulling the fan blade 154 out radially from a hub and drag forces pulling the fan blade 154 tangentially back along its direction of rotation towards the fully extended position.

Further, it will be appreciated that when the fan blades 154 are not rotating, aerodynamic forces may push the fan blades 154 back towards a nacelle of a gas turbine engine including the fan blade 154 (see FIG. 1). This may reduce their frontal area and reduce a drag. Centrifugal and drag forces on the fan blade 154 balance against thrust forces result in a natural damping system. Thrust forces are balanced by centrifugal forces, allowing the fan blade 154 to float and providing natural damping for dissymmetric forces.

As will be appreciated, in certain embodiments, a fan in accordance with an embodiment of the present disclosure may include a plurality of flapping hinges and a plurality of fan blades, with each flapping hinge coupled to or integrated into a respective fan blade of the plurality of fan blades. Flapping hinges may allow for movement of the fan blades in the axial direction A, which may reduce the dissymmetry of lift by changing the effective angle of attack on the fan blades. The flapping hinges also allow some of the dissymmetric lift to be absorbed by the inertia of the fan blades themselves as they move axially. Optionally, the flapping hinges can also allow the fan blades to lay back against the nacelle when not rotating, reducing frontal area and drag during an in-fight shutdown.

Further, inclusion of the plurality of flapping hinges, with each coupled to or integrated into a respective fan blade of the plurality of fan blades, may allow each of the respective fan blades to be fully extended as it rotates about a respective flapping hinge axis. As such, by the time the fan blades fully rotate about their respective flapping hinge axes, they fan blades may be fully feathered. A maximum angle that the fan blades can feather (also referred to as "cone aft") may be determined by the flapping hinge angle with a longitudinal axis (see FIG. 3). At maximum aft deflection, the fan blade pitch has changed such that it is fully feathered. When employing an angled flapping hinge, no additional actuation is required for the fan blade to be fully feathered.

As will further be appreciated, although inclusion of the flapping hinges may provide natural feathering of fan blades at relatively low speeds and in flight when the fan blades are not rotating, this may not negatively impact a thrust of a gas turbine engine because the drag and centrifugal forces may pull the fan blades out to be fully extended when the fan is rotating at relatively high speeds. As such, while the gas turbine engine is running at relatively high speeds, the fan blades will stay fully extended and the angle of attack will not end up changing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An engine defining a longitudinal axis, comprising: a turbomachine; a fan drivingly coupled with the turbomachine, the fan being a forward thrust fan and comprising: a hub; a plurality of fan blades, the plurality of fan blades comprising a first fan blade; and a flapping hinge integrated into the first fan blade or coupled to the fan blade, at least a portion of the first fan blade moveable about the flapping hinge to define a variable angle with the longitudinal axis.

The engine of any preceding clause, wherein the variable angle is between about 90 degrees and about 45 degrees.

The engine of any preceding clause, wherein the flapping hinge is integrated into the first fan blade.

The engine of any preceding clause, wherein the first fan blade includes an outer portion and an inner portion, wherein the outer portion is rotatable about the flapping hinge relative to the inner portion.

The engine of any preceding clause, wherein the flapping hinge comprises a biasing member positioned to bias the flapping hinge towards a fully extended position.

The engine of any preceding clause, wherein the plurality of blades are configured to rotate at a rotational speed between about 800 rpm and about 4000 rpm.

The engine of any preceding clause, further comprising a plurality of flapping hinges, wherein the flapping hinge is a first flapping hinge of the plurality of flapping hinges, and wherein each of the plurality of fan blades includes at least a portion moveable about a respective one of the plurality of flapping hinges to define a variable angle with the longitudinal axis.

The engine of any preceding clause, wherein the flapping hinge defines a flapping hinge axis, and wherein the flapping hinge axis defines an angle greater than 0 with a plane defined by the longitudinal axis and a radial direction of the engine.

The engine of any preceding clause, wherein the flapping hinge defines a flapping hinge axis, and wherein the flapping hinge axis defines an angle greater than 0 with a plane defined by the longitudinal axis and a tangent to a circumferential direction where the flapping hinge axis meets a leading edge of the first fan blade.

The engine of any preceding clause, wherein the flapping hinge comprises a hinge shaft defining a flapping hinge axis.

The engine of any preceding clause, wherein the engine is a turbofan engine.

The engine of any preceding clause, wherein the fan is an unducted fan.

The engine of any preceding clause, further comprising: a pitch actuating system, wherein the first fan blade defines a pitch, and wherein the pitch actuating system rotates the first fan blade to change the pitch of the first fan blade independently of the flapping hinge.

A fan blade for a fan of an engine, the engine defining a longitudinal axis, the fan blade comprising: an airfoil portion configured to rotate about the longitudinal axis to generate thrust during operation of the engine; and a flapping hinge integrated into the airfoil portion or coupled to the airfoil portion, at least a portion of the airfoil portion moveable about the flapping hinge to define a variable angle with the longitudinal axis during operation of the engine.

The fan blade of any preceding clause, wherein the variable angle is between about 90 degrees and about 45 degrees.

The fan blade of any preceding clause, wherein the flapping hinge is integrated into the airfoil portion of the fan blade.

The fan blade of any preceding clause, wherein the airfoil portion of the fan blade includes an outer portion and an inner portion, wherein the outer portion is rotatable about the flapping hinge relative to the inner portion.

The fan blade of any preceding clause, wherein the flapping hinge comprises a biasing member positioned to bias the flapping hinge towards a fully extended position.

The fan blade of any preceding clause, wherein the flapping hinge comprises a hinge shaft defining a flapping hinge axis.

The fan blade of any preceding clause, wherein the flapping hinge defines a flapping hinge axis, and wherein the flapping hinge axis defines an angle greater than 0 with a plane defined by the longitudinal axis and a tangent to a circumferential direction where the flapping hinge axis meets a leading edge of the fan blade.

I claim:

1. An engine defining a longitudinal axis and having an axial direction that extends parallel to the longitudinal axis, comprising:
   a turbomachine;
   a fan drivingly coupled with the turbomachine, the fan being a forward thrust fan and comprising:
      a hub;
      a plurality of fan blades, the plurality of fan blades comprising a first fan blade; and
      a flapping hinge integrated into the first fan blade or coupled to the fan blade, at least a portion of the first fan blade moveable about the flapping hinge to define a variable angle with the longitudinal axis;
   wherein the flapping hinge defines a flapping hinge axis that meets a leading edge of the first fan blade, and wherein the flapping hinge axis defines an angle greater than 0 with a plane defined by the axial direction and a tangent to a circumferential direction.

2. The engine of claim 1, wherein the variable angle is between 90 degrees and 45 degrees.

3. The engine of claim 1, wherein the flapping hinge is integrated into the first fan blade.

4. The engine of claim 3, wherein the first fan blade includes an outer portion and an inner portion, wherein the outer portion is rotatable about the flapping hinge relative to the inner portion.

5. The engine of claim 1, wherein the flapping hinge comprises a biasing member positioned to bias the flapping hinge towards a fully extended position of the first blade.

6. The engine of claim 1, wherein the plurality of blades are configured to rotate at a rotational speed between 800 rpm and 4000 rpm.

7. The engine of claim 1, further comprising a plurality of flapping hinges, wherein the flapping hinge is a first flapping hinge of the plurality of flapping hinges, and wherein each of the plurality of fan blades includes at least a portion moveable about a respective one of the plurality of flapping hinges to define a variable angle with the longitudinal axis.

8. The engine of claim 1, wherein the flapping hinge axis defines an angle greater than 0 with a plane defined by the longitudinal axis and a radial direction of the engine.

9. The engine of claim 1, wherein the flapping hinge comprises a hinge shaft defining the flapping hinge axis.

10. The engine of claim 1, wherein the engine is a turbofan engine.

11. The engine of claim 1, wherein the fan is an unducted fan.

12. The engine of claim 1, further comprising:
   a pitch actuating system, wherein the first fan blade defines a pitch, and wherein the pitch actuating system rotates the first fan blade to change the pitch of the first fan blade independently of the flapping hinge.

13. A fan blade for a fan of a turbomachine engine, the engine defining a longitudinal axis and having an axial direction that extends parallel to the longitudinal axis, the fan blade comprising:
   an airfoil portion rotatable about the longitudinal axis to generate thrust during operation of the turbomachine engine; and
   a flapping hinge integrated into the airfoil portion or coupled to the airfoil portion, at least a portion of the airfoil portion moveable about the flapping hinge to define a variable angle with the longitudinal axis during operation of the turbomachine engine;
   wherein the flapping hinge defines a flapping hinge axis that meets a leading edge of the first fan blade, and wherein the flapping hinge axis defines an angle greater than 0 with a plane defined by the axial direction and a tangent to a circumferential direction.

14. The fan blade of claim 13, wherein the variable angle is between 90 degrees and 45 degrees.

15. The fan blade of claim 13, wherein the flapping hinge is integrated into the airfoil portion of the fan blade.

16. The fan blade of claim 15, wherein the airfoil portion of the fan blade includes an outer portion and an inner portion, wherein the outer portion is rotatable about the flapping hinge relative to the inner portion.

17. The fan blade of claim 13, wherein the flapping hinge comprises a biasing member positioned to bias the flapping hinge towards a fully extended position of the blade.

18. The fan blade of claim 13, wherein the flapping hinge comprises a hinge shaft defining the flapping hinge axis.

* * * * *